United States Patent
Ogasawara et al.

(10) Patent No.: US 8,351,303 B2
(45) Date of Patent: Jan. 8, 2013

(54) STEPPING MOTOR CONTROLLER AND ANALOG ELECTRONIC TIMEPIECE

(75) Inventors: Kenji Ogasawara, Chiba (JP); Akira Takakura, Chiba (JP); Saburo Manaka, Chiba (JP); Keishi Honmura, Chiba (JP); Takanori Hasegawa, Chiba (JP); Kosuke Yamamoto, Chiba (JP); Kazumi Sakumoto, Chiba (JP); Kazuo Kato, Chiba (JP)

(73) Assignee: Seiko Instruments Inc. (JP)

( * ) Notice: Subject to any disclaimer, the term of this patent is extended or adjusted under 35 U.S.C. 154(b) by 498 days.

(21) Appl. No.: 12/653,539

(22) Filed: Dec. 15, 2009

(65) Prior Publication Data

US 2010/0149924 A1  Jun. 17, 2010

(30) Foreign Application Priority Data

Dec. 16, 2008  (JP) .................. 2008-319400

(51) Int. Cl.
*H02P 8/38* (2006.01)
*G04B 19/04* (2006.01)

(52) U.S. Cl. ......................... 368/80; 318/696

(58) Field of Classification Search .............. 368/80; 318/696
See application file for complete search history.

(56) References Cited

U.S. PATENT DOCUMENTS

| 4,272,837 A * | 6/1981 | Ueda et al. ............ 368/80 |
| 4,382,691 A | 5/1983 | Shida et al. ........... 368/157 |
| 5,550,795 A * | 8/1996 | Takakura et al. ....... 368/157 |
| 5,889,734 A * | 3/1999 | Sato ..................... 368/64 |
| 6,946,814 B2 * | 9/2005 | Takemori et al. ....... 318/685 |
| 7,283,428 B2 * | 10/2007 | Ogasawara .............. 368/157 |
| 7,606,116 B2 * | 10/2009 | Manaka et al. .......... 368/157 |
| 7,885,361 B2 * | 2/2011 | Iorga .................... 375/326 |
| 8,111,033 B2 * | 2/2012 | Ogasawara et al. ...... 318/696 |
| 8,219,003 B2 * | 7/2012 | Kudo et al. ............. 399/167 |
| 2008/0089183 A1 * | 4/2008 | Manaka et al. .......... 368/202 |
| 2009/0316535 A1 * | 12/2009 | Ogasawara et al. ....... 368/80 |

OTHER PUBLICATIONS

Patent Abstracts of Japan, publication No. JP54075520, publication date Jun. 16, 1979.
Patent Abstracts of Japan, publication No. JP54077168, publication date Jun. 20, 1979.

* cited by examiner

*Primary Examiner* — Sean Kayes
(74) *Attorney, Agent, or Firm* — Adams & Wilks (57) ABSTRACT

An invention allows a stepping motor to be reliably driven to rotate when initializing the driving and allows power consumption of the stepping motor to be reduced. The controller, when initializing the driving (for example, replacing a battery), controls a main drive pulse generator to drive a stepping motor using a main drive pulse having a maximum energy and sets the generation cycle of a pulse down control signal of a pulse down counter for pulsing down the main drive pulse to a first cycle to drive the stepping motor, and when pulsing down the main drive pulse to that having a predetermined energy, changes the generation cycle of the pulse down control signal of the pulse down counter to a second cycle.

20 Claims, 7 Drawing Sheets

| ROTATION DETECTED DURING | | | | DECISION | RANKING | |
|---|---|---|---|---|---|---|
| T1 | T2 | T3 | DETERMINATION | | P1 | P2 |
| 0 | 1 | 1/0 | ROTATING WITH A SUFFICIENT MARGIN | DOWN | −1 RANK | NO |
| 1 | 1 | 1/0 | ROTATING WITH LITTLE MARGIN | AS IT IS | 0 | NO |
| 1/0 | 0 | 1 | ROTATING WITH NO MARGIN | UP | +1 RANK | NO |
| 1/0 | 0 | 0 | NOT ROTATING | P2+UP | +1 RANK | YES |

STEPPING MOTOR CONTROLLER AND ANALOG ELECTRONIC TIMEPIECE

BACKGROUND OF THE INVENTION

1. Field of the Invention

The present invention relates to a stepping motor controller and an analog electronic timepiece using the stepping motor controller.

2. Description of the Related Art

Conventionally, a stepping motor is used in an analog electronic timepiece and the like. The stepping motor includes: a stator having a rotor-containing hole and a positioner for determining a rotor stopping position; a rotor disposed in the rotor-containing hole; and a coil. Also, the stepping motor is adapted to rotate the rotor by applying alternating signal to the coil to generate magnetic flux in the stator, and to stop the rotor at a position corresponding to the positioner.

In conventional electronic timepieces including a stepping motor controller for driving a stepping motor with a minimum energy, the stepping motor is driven by a plurality of drive pulses, as inventions described in JP-B-63-018148, JP-B-63-018149, and JP-B-57-018440. When the stepping motor controller receives a detection result from a rotation detector and determines that the stepping motor is not rotating, the stepping motor controller pulses up (ranks up) a main drive pulse to that having larger energy, and repeats this until the stepping motor can be driven by the main drive pulse. Also, the stepping motor controller pulses down (ranks down) the main drive pulse to that having smaller energy at regular time intervals to determine whether the main drive pulse is excessively pulsed up or not. The stepping motor controller can determine the margin for driving the stepping motor based on when an induced voltage (detection signal) exceeding a predetermined reference threshold voltage has been detected, and if determines that there is no margin for driving, does not pulse down the main drive pulse. Thus the stepping motor controller can control the rotation of the stepping motor while reducing power consumption.

However, when initializing the driving (such as powering on or resetting), the main drive pulse having small energy may stop the motor.

In order not to stop the motor, starting with the main drive pulse with a sufficient margin for driving may cause the motor to rotate. In this case, however, large consumption current flows until the main drive pulse is pulsed down to that for normal driving, which raises a problem of wasting energy for a long time.

Also, in this period, consumption current is measured to be higher than that in normal driving. So, in order to measure correct consumption current, the measurement should be performed after the main drive pulse is pulsed down to an optimum one through the repetition of pulsing down at regular time intervals.

SUMMARY OF THE INVENTION

It is an aspect of the present invention to allow a stepping motor to be reliably driven to rotate when initializing the driving and allow power consumption of the stepping motor to be reduced.

In accordance with the invention, a stepping motor controller is provided, the stepping motor controller including: a pulse down counter for outputting a pulse down control signal for controlling to pulse down main drive pulse in a first cycle or a second cycle longer than the first cycle; a drive pulse generator for outputting a main drive pulse or a correction drive pulse according to a pulse control signal and, in response to the pulse down control signal, pulsing down and outputting the main drive pulse; a motor driver for rotationally driving the stepping motor in response to the drive pulse from the drive pulse generator; a rotation detector for detecting whether or not a detection signal generated due to the rotation of the stepping motor during a rotation detection period of time has exceeded a reference threshold voltage; and a controller for outputting the pulse control signal for controlling the drive pulse generator to drive the stepping motor using one of a plurality of main drive pulses, the energy of each of which is different from the others, or a correction drive pulse, the energy of which is larger than each of the plurality of main drive pulses, based on detection result from the rotation detector, in which the controller, when initializing the driving, sets the main drive pulse to that having a maximum energy and sets the generation cycle of the pulse down control signal of the pulse down counter to the first cycle to drive the stepping motor, and when pulsing down the main drive pulse to that having a predetermined energy, changes the generation cycle of the pulse down control signal of the pulse down counter to the second cycle.

The controller, when initializing the driving, sets the main drive pulse to that having a maximum energy and sets the generation cycle of the pulse down control signal of the pulse down counter to the first cycle to drive the stepping motor, and when pulsing down the main drive pulse to that having a predetermined energy, changes the generation cycle of the pulse down control signal of the pulse down counter to the second cycle.

The rotation detection period of time may be divided into a first detection period immediately after the driving using the main drive pulse, a second detection period after the first detection period, and a third detection period after the second detection period, and when the rotation detector detects a detection signal exceeding the reference threshold voltage, the controller may change the pulse down cycle of the pulse down counter to the second cycle.

Also, the rotation detection period of time may be divided into a first detection period immediately after the driving using the main drive pulse, a second detection period after the first detection period, and a third detection period after the second detection period, and when the rotation detector does not detect a detection signal exceeding the reference threshold voltage during any of the first and second detection periods, the controller may change the pulse down cycle of the pulse down counter to the second cycle.

Also, the stepping motor controller may include a battery for providing drive power to the components, and initializing the driving may be performed by replacing the battery.

Also in accordance with the invention, an analog electronic timepiece is provided, the analog electronic timepiece including: a stepping motor for rotationally driving hands of a watch; and a stepping motor controller for controlling the stepping motor, in which, as the stepping motor controller, one of the above-described stepping motor controllers is used.

The analog electronic timepiece may include a crown, and initializing the driving may be performed by pulling the crown.

The invention allows a stepping motor to be reliably driven to rotate when initializing the driving and allows power consumption of the stepping motor to be reduced. Also, consumption current can be measured in a short time.

DESCRIPTION OF THE PREFERRED EMBODIMENTS

Figure 1:
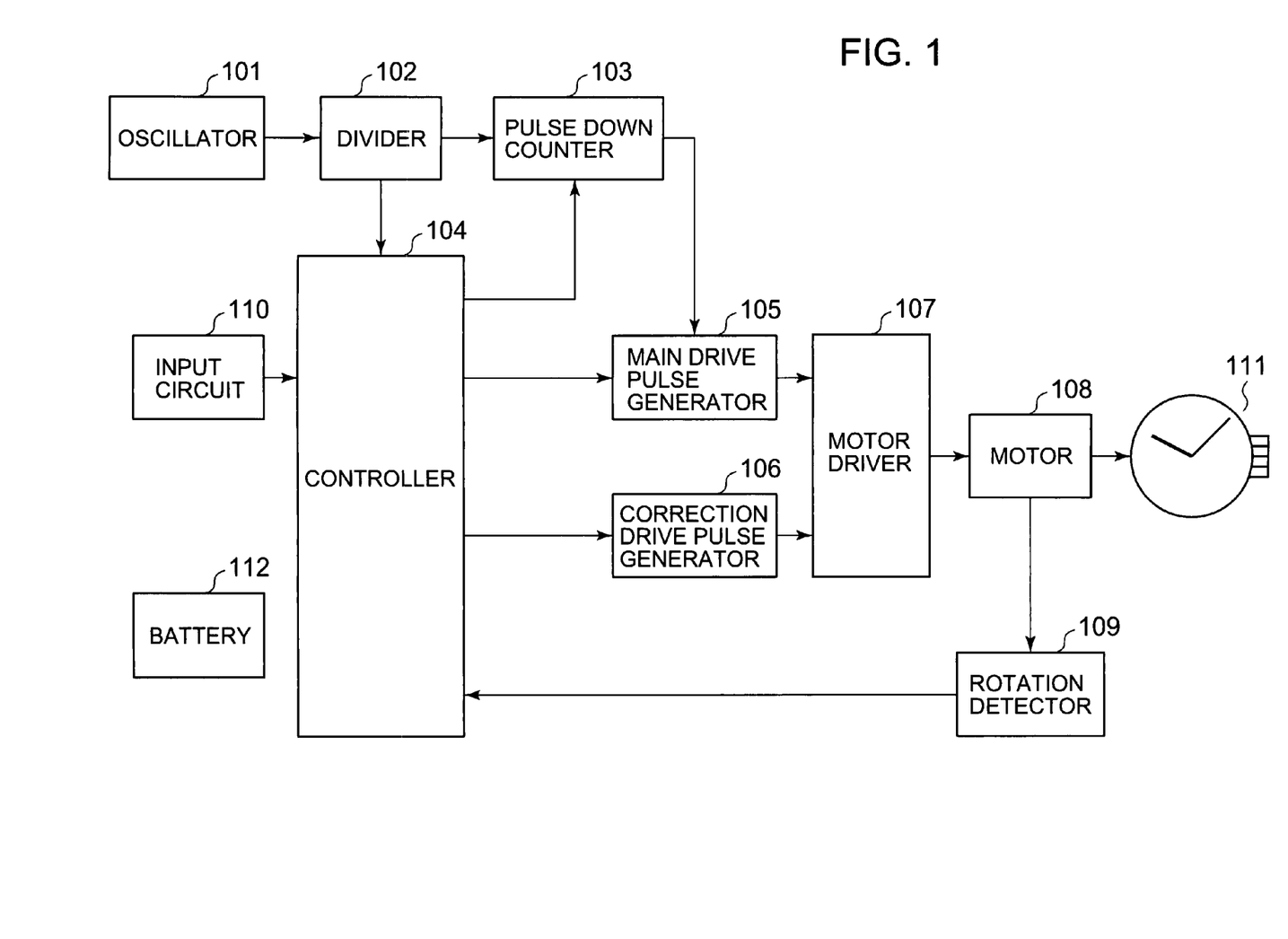
FIG. 1 is a block diagram of an analog electronic timepiece in accordance with an embodiment of the present invention.

FIG. 1 is a block diagram of an analog electronic timepiece using a stepping motor controller in accordance with an embodiment of the present invention, taking an analog electronic watch as an example.

Referring to FIG. 1, the analog electronic timepiece includes: an oscillator 101 for generating a signal of a predetermined frequency; a divider 102 for dividing the signal generated by the oscillator 101 to generate a timepiece signal to be used as a timing reference; a controller 104 for controlling various electronic circuit components included in the electronic timepiece, the changing of drive pulses, and the like; a pulse down counter 103 for outputting a pulse down control signal to pulse down a main drive pulse after timing the timepiece signal from the divider 102 for a predetermined time; and a main drive pulse generator 105 for selecting and outputting a main drive pulse P1 for rotationally driving a motor based on a pulse control signal from the controller 104.

In addition, the analog electronic timepiece includes: a correction drive pulse generator 106 for outputting a correction drive pulse P2 for forcedly rotationally driving a motor based on the pulse control signal from the controller 104; a motor driver 107 for rotationally driving a stepping motor 108 in response to the main drive pulse P1 from the main drive pulse generator 105 and the correction drive pulse P2 from the correction drive pulse generator 106; the stepping motor 108; an analog display section 111 having hands of a watch for displaying a time and being rotationally driven by the stepping motor 108; a rotation detector 109 for detecting during a predetermined rotation detection period a detection signal corresponding to an induced voltage according to the rotation of the stepping motor 108; an input circuit 110 for outputting an initialization signal in response to operating a crown (not shown); and a battery 112 as a power source for supplying drive power to the components 101 to 111.

The pulse down counter 103 has a function for outputting a pulse down control signal to the main drive pulse generator 105 in one of two or more predetermined cycles, and is controlled by the controller 104 to change the generation cycle of the pulse down control signal by selecting from the two or more cycles or to stop generating the pulse down control signal. In this embodiment, the two or more predetermined cycles are a first cycle (for example, 10 seconds) and a second cycle longer than the first cycle (for example, 80 seconds). The generation cycle of the pulse down control signal is changed by switching between the cycles under the control of the controller 104.

The controller 104 also has a function for controlling the changing of the main drive pulse and the pulse down cycle when initializing the driving, and a function as a detection period determination circuit for comparing a time at which a detection signal exceeding a reference threshold voltage Vcomp due to the rotation of the stepping motor 108 is detected by the rotation detector 109 with a detection period during which the detection signal is detected to determine the detection period during which the detection signal is detected, and the like. Note that, as described later, the rotation detection period of time during which whether the stepping motor 108 has rotated or not is detected is divided into three detection periods. As an example of initializing the driving, the input circuit 110 may output a initializing signal when the battery 112 is replaced or in response to operating the crown (for example, pulling the crown).

The rotation detector 109 is configured to be similar to the rotation detector described in JP-B-63-018148, and the reference threshold voltage Vcomp is predetermined so that, when the stepping motor 108 has rotated, a detection signal corresponding to an induced voltage exceeding the Vcomp will be detected, and when the stepping motor 108 has not rotated, the detection signal exceeding the Vcomp will not be detected.

Note that the oscillator 101 and the divider 102 are used for generating a signal. The analog display section 111 is used for displaying a time. The rotation detector 109 is used for detecting a rotation. The controller 104 is used for controlling. The main drive pulse generator 105 and the correction drive pulse generator 106 are used for generating a drive pulse. The motor driver 107 is used for driving a motor. The input circuit 110 is used for inputting.

Figure 2:
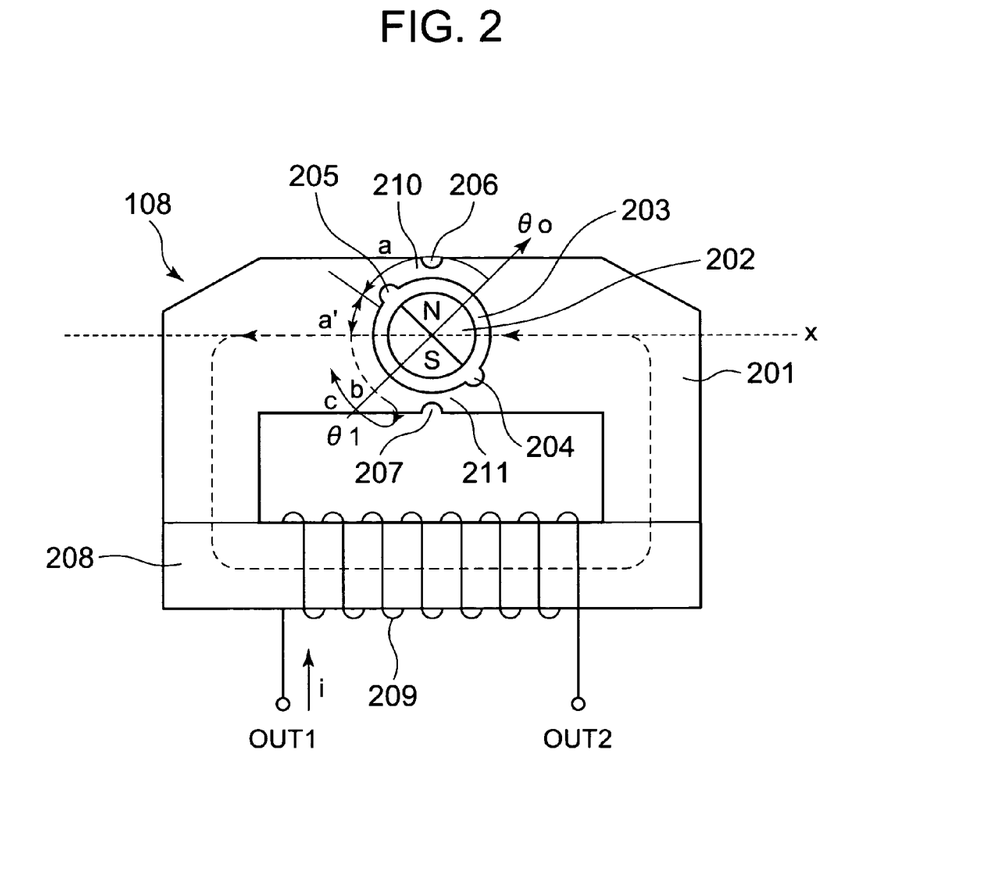
FIG. 2 is a schematic diagram of a stepping motor used in the analog electronic timepiece in accordance with the embodiment of the invention.

FIG. 2 shows a configuration of the stepping motor 108 used in accordance with the embodiment of the invention, taking as an example a stepping motor for a timepiece commonly used in analog electronic timepieces.

Referring to FIG. 2, the stepping motor 108 includes: a stator 201 having a rotor-containing through-hole 203; a rotor 202 rotatably disposed in the rotor-containing through-hole 203; a magnetic core 208 joined to the stator 201; and a coil 209 wound around the magnetic core 208. When the stepping motor 108 is used in an analog electronic timepiece, the stator 201 and the magnetic core 208 are fastened to a base plate (not shown) with a screw (not shown) and joined to each other. The coil 209 has a first terminal OUT1 and a second terminal OUT2.

The rotor 202 is magnetized to two poles (south and north poles). On the outer edge of the stator 201 formed of a magnetic material, two or more (two in the embodiment) outer notches 206, 207 are provided opposite to each other separated by the rotor-containing through-hole 203. Saturable portions 210, 211 are provided between the outer notches 206, 207 and the rotor-containing through-hole 203.

The saturable portions 210, 211 are not magnetically saturated by a magnetic flux from the rotor 202, but when the coil 209 is energized, are magnetically saturated to increase their magnetoresistance. The rotor-containing through-hole 203 is formed to be a circular hole shape such that two or more (two in the embodiment) half-moon shaped inner notches 204, 205 are integrally formed opposite to each other on the circular outline of the through-hole.

The notches 204, 205 function as a positioner for determining a stopping position of the rotor 202. When the coil 209 is not energized, the rotor 202 is stably stopped at the position corresponding to the positioner as shown in FIG. 2, in other words, at the position such that the magnetic pole axis of the rotor 202 is perpendicular to the line connecting the notches 204, 205 (the position at a predetermined angle $\theta_0$ with respect to the direction X in which magnetism flows).

When a drive pulse of rectangular wave is applied from the motor driver 107 to between the terminals OUT1 and OUT2 of the coil 209 (for example, which drives the motor with a signal of a first polarity, in which the first terminal OUT1 is a positive pole and the second terminal OUT2 is a negative pole) and a current i is caused to flow in the arrow direction shown in FIG. 2, a magnetic flux is generated in the direction of the broken arrow in the stator 201. This saturates the saturable portions 210, 211 to increase the magnetoresistance. Then the interaction between the magnetic pole generated in the stator 201 and the magnetic pole of the rotor 202 rotates the rotor 202 by 180° in the arrow direction shown in FIG. 2 and stably stops the rotor 202 with the magnetic pole axis at an angle of $\theta_1$.

Next, when a drive pulse of rectangular wave of the polarity opposite to the first polarity is applied from the motor driver 107 to between the terminals OUT1 and OUT2 of the coil 209 (which drives the motor with a signal of a second polarity, in which the first terminal OUT1 is a negative pole and the second terminal OUT2 is a positive pole) and a current is caused to flow in the counter-arrow direction in FIG. 2, a magnetic flux is generated in the counter-broken-arrow direction in the stator 201. This first saturates the saturable portions 210, 211. Then the interaction between the magnetic pole generated in the stator 201 and the magnetic pole of the rotor 202 rotates the rotor 202 by 180° in the same direction as the previous one and stably stops the rotor 202.

From then on, applying a signal of the polarity opposite to the previous one (an alternating signal) to the coil 209 in this way repeatedly cause the above-described operation, which can continuously rotate the rotor 202 in steps of 180° in the arrow direction. Note that, as described later, the drive pulses used in the embodiment are a plurality of main drive pulses P10 to P1$m$, the energy of each of which is different from the others, and a correction drive pulse P2.

FIGS. 3 to 6 are timing charts showing the drive timing for the stepping motor 108, the rotation detection timing, and the type of drive pulses to be used, in accordance with the embodiment, taking the case of driving the stepping motor 108 using the main drive pulse P1 and the correction drive pulse P2.

Immediately after the driving period during which the stepping motor 108 is driven by the main drive pulse P1, the rotation detection period of time during which whether the stepping motor 108 has rotated or not is detected is provided. The rotation detection period of time is divided into two or more detection periods.

In the embodiment, the rotation detection period of time is divided into three detection periods, which are a first detection period immediately after the driving using the main drive pulse, a second detection period after the first detection period, and a third detection period after the second detection period. The way of controlling the driving of the stepping motor 108 is varied depending on in which of the detection periods T1 to T3 a detection signal corresponding to an induced signal exceeding the reference threshold voltage Vcomp has been detected. The detection periods T1 to T3 is also used for controlling the changing of the generation cycle of the pulse down control signal of the pulse down counter 103.

Figure 3:
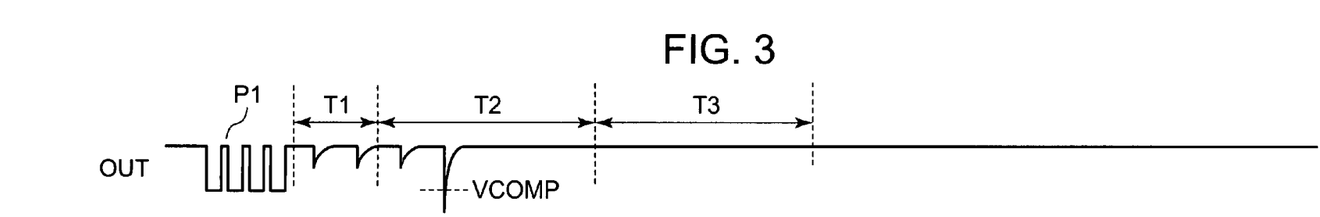
FIG. 3 is a timing chart for describing the operation of a stepping motor controller and the analog electronic timepiece in accordance with the embodiment of the invention.

Referring to FIG. 3, under the control of the controller 104, the main drive pulse generator 105 outputs the main drive pulse P1 and the motor driver 107 rotationally drives the motor 108. In this example, a detection signal exceeding a predetermined reference threshold voltage Vcomp has been detected by the rotation detector 109 only during the detection period T2 of the detection periods T1 to T3, and then, the controller 104 determines that the stepping motor 108 is rotating, but the drive energy of the main drive pulse P1 is excessive (that is, the motor is driven to rotate with a sufficient margin).

In this case, when driving the motor after a predetermined time, the controller 104 drives the motor by ranking down (pulsing down) the drive energy of the main drive pulse P1 by one rank, so the controller 104 does not control the pulse down counter 103. Thus, when the predetermined cycle elapses the pulse down counter 103 outputs a pulse down control signal for pulsing down the drive energy by one rank to the main drive pulse generator 105. In response to the pulse down control signal, the main drive pulse generator 105 pulses down the main drive pulse P1 by one rank and rotationally drives the motor 108 through the motor driver 107 using the pulsed-down main drive pulse P1.

Figure 4:
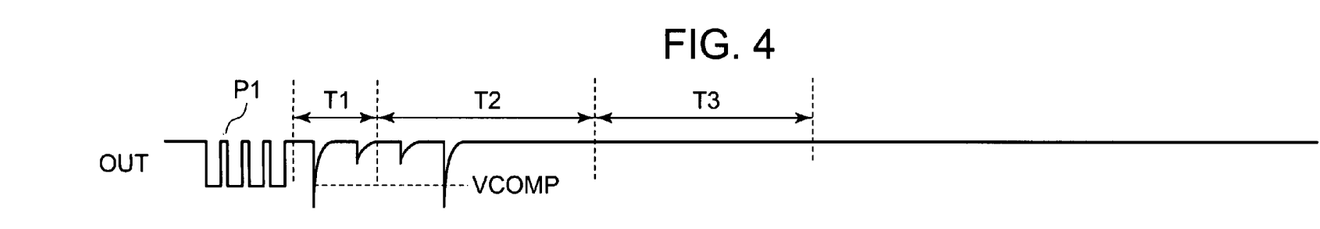
FIG. 4 is a timing chart for describing the operation of the stepping motor controller and the analog electronic timepiece in accordance with the embodiment of the invention.

FIG. 4 shows an example of the case that, when the stepping motor 108 is driven by the main drive pulse P1 in accordance with the embodiment, a detection signal exceeding the reference threshold voltage Vcomp has been detected by the rotation detector 109 during the first detection period T1 and the second detection period T2.

In this case, the controller 104 determines that the stepping motor 108 is rotating, and the drive energy of the main drive pulse P1 is optimum (that is, the motor is driven to rotate with little margin), and then, the controller 104 controls the main drive pulse generator 105 to perform the next driving using the same main drive pulse P1. Also, the controller 104 controls the pulse down counter 103 not to output the pulse down control signal even when the pulse down counter 103 times the predetermined cycle. Accordingly, the pulse down counter 103 does not output the pulse down control signal to the main drive pulse generator 105, and the main drive pulse P1 is not pulsed down.

Figure 5:
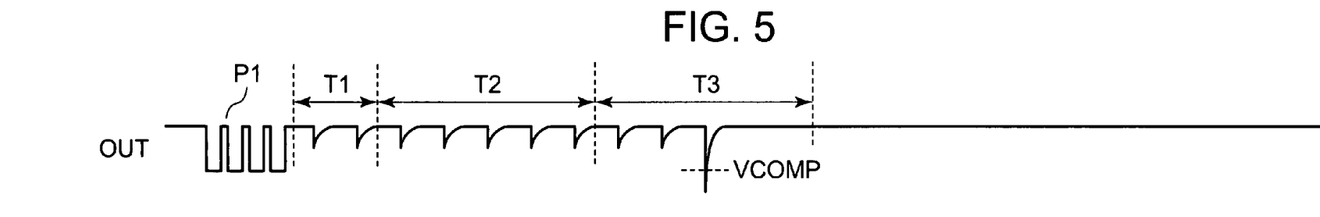
FIG. 5 is a timing chart for describing the operation of the stepping motor controller and the analog electronic timepiece in accordance with the embodiment of the invention.

FIG. 5 shows an example of the case that, when the stepping motor 108 is driven by the main drive pulse P1 in accordance with the embodiment, a detection signal exceeding the reference threshold voltage Vcomp has been detected by the rotation detector 109 only during the third detection period T3.

In this case, the controller 104 determines that the stepping motor 108 is rotating, but the drive energy of the main drive pulse P1 is insufficient (that is, the motor is driven to rotate with no margin), so, when performing the next driving using the same main drive pulse P1, the stepping motor 108 may not rotate. Then, when performing the next driving, the controller 104 controls the main drive pulse generator 105 to drive the motor by ranking up (pulsing up) the drive energy of the main drive pulse P1 by one rank, rather than driving using a correction drive pulse P2.

Also, the controller 104 controls the pulse down counter 103 not to output the pulse down control signal even when the pulse down counter 103 times the predetermined cycle. Accordingly, the pulse down counter 103 does not output the pulse down control signal to the main drive pulse generator 105, and the main drive pulse P1 is not pulsed down.

Figure 6:
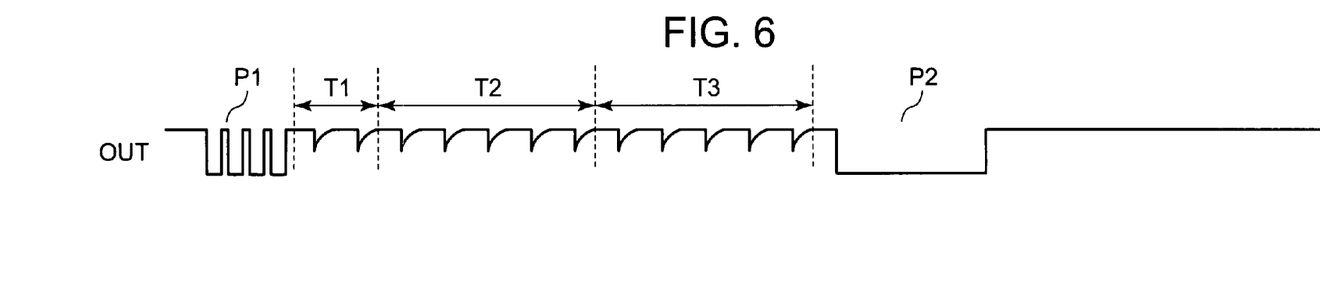
FIG. 6 is a timing chart for describing the operation of the stepping motor controller and the analog electronic timepiece in accordance with the embodiment of the invention.

FIG. 6 shows an example of the case that, when the stepping motor 108 is driven by the main drive pulse P1 in accordance with the embodiment, a detection signal exceeding the reference threshold voltage Vcomp has not been detected by the rotation detector 109 during any of the first detection period T1, the second detection period T2, and the third detection period T3.

In this case, the controller 104 determines that the stepping motor 108 is not rotating, and the drive energy of the main drive pulse P1 is further insufficient (that is, the motor is not driven to rotate). Then, the controller 104 controls the correction drive pulse generator 106 to forcedly rotationally drive the motor using the correction drive pulse P2, and then, when performing the next driving, the controller 104 controls the main drive pulse generator 105 to drive the motor by ranking up the drive energy of the main drive pulse P1 by one rank. Accordingly, the correction drive pulse generator 106 drives the motor using the correction drive pulse P2, and when performing the next driving, the main drive pulse generator 105 drives the motor using the main drive pulse P1 ranked up by one rank.

Also, the controller 104 controls the pulse down counter 103 not to output the pulse down control signal even when the pulse down counter 103 times the predetermined cycle. Accordingly, the pulse down counter 103 does not output the pulse down control signal to the main drive pulse generator 105, and the main drive pulse P1 is not pulsed down.

The relation between the rotational driving period/rotation detection period and the rotating motion of the motor 108 is described with reference to FIG. 2. The motor 108 is driven by drive pulses in an area a. A detection signal corresponding to an induced voltage generated in an area a' is detected in the detection period T1. A detection signal generated in an area c is detected in the detection period T2 or T3 (the drive energy includes a larger margin when the detection signal is detected in the detection period T2 than when detected in the detection period T3). A detection signal generated in an area b is detected to be of a reversed polarity across the detection periods T1 and T2.

Specifically, the detection signal is generated due to the rotor vibration after the drive pulse stops, so the timing at which the detection signal induced during the first detection period T1 is generated is limited to during the area in which the motor is driven to rotate with no margin (almost stopped) or with little margin. When the motor is driven to rotate with a sufficient margin, the detection signal is not generated (which corresponds to the area a' in FIG. 2).

When the motor is driven with a sufficient margin, the drive pulse stops during the area b and then the induced voltage is output with a reversed phase. Also, due to the movement of the rotor, the height of the detection signal in the first detection period T1 is inversely proportional to a decrease in the margin for driving. In this way, the extent of the margin for driving can be determined.

In the embodiment, based on these feature, when a detection signal exceeding the reference threshold voltage Vcomp is generated in the first detection period T1, it is determined that the margin for driving has decreased, and then the pulse down counter 103 does not pulse down, but maintains the drive pulses not to decrease the energy of the drive pulses.

Figure 7:
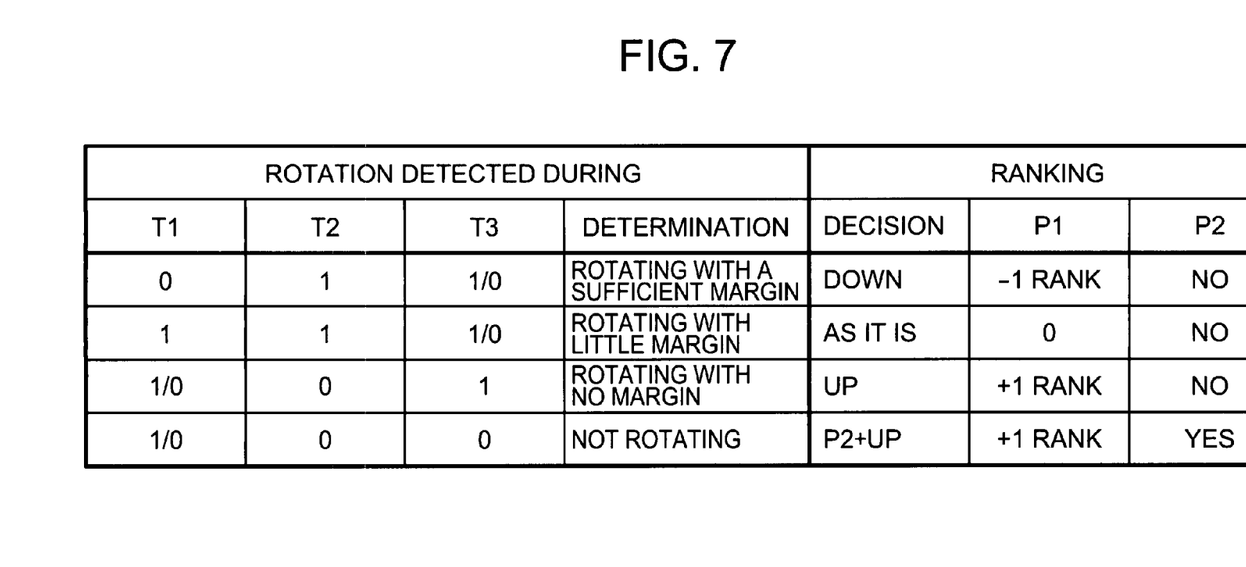
FIG. 7 is a determination chart for describing the operation of the stepping motor controller and the analog electronic timepiece in accordance with the embodiment of the invention.

FIG. 7 is a determination chart in which the relations between the rotation detection result and the ranking of drive pulses are summarized, including the relations described above.

Referring to FIG. 7, when a detection signal indicating a rotation has been detected only during the detection period T2, or only during T2 and T3, it is determined that the motor is rotating with a sufficient margin in the drive energy, and then the main drive pulse P1 is ranked down by one rank.

When a detection signal indicating a rotation has been detected during all of the detection periods T1 to T3 or only during the detection periods T1 and T2 (that is, at least during the detection periods T1 and T2), it is determined that the motor is rotating with little margin not allowing the drive energy to be ranked down, and then the main drive pulse P1 is not changed, but maintained as it is.

When a detection signal indicating a rotation has been detected only during the detection periods T1 and T3, or only during the detection period T3, it is determined that the motor is rotating with no margin in the drive energy, and then the main drive pulse P1 is ranked up by one rank.

When a detection signal indicating a rotation has been detected only during the detection period T1, or when the detection signal has not been detected during any of the detection periods T1 to T3, it is determined that the motor is not rotating, and then the motor is driven by the correction drive pulse P2, and then the main drive pulse P1 is ranked up by one rank.

As described above, when a detection signal indicating a rotation has been detected at least during the detection period T1, the controller 104 controls the pulse down counter 103 not to rank down.

Figure 8:
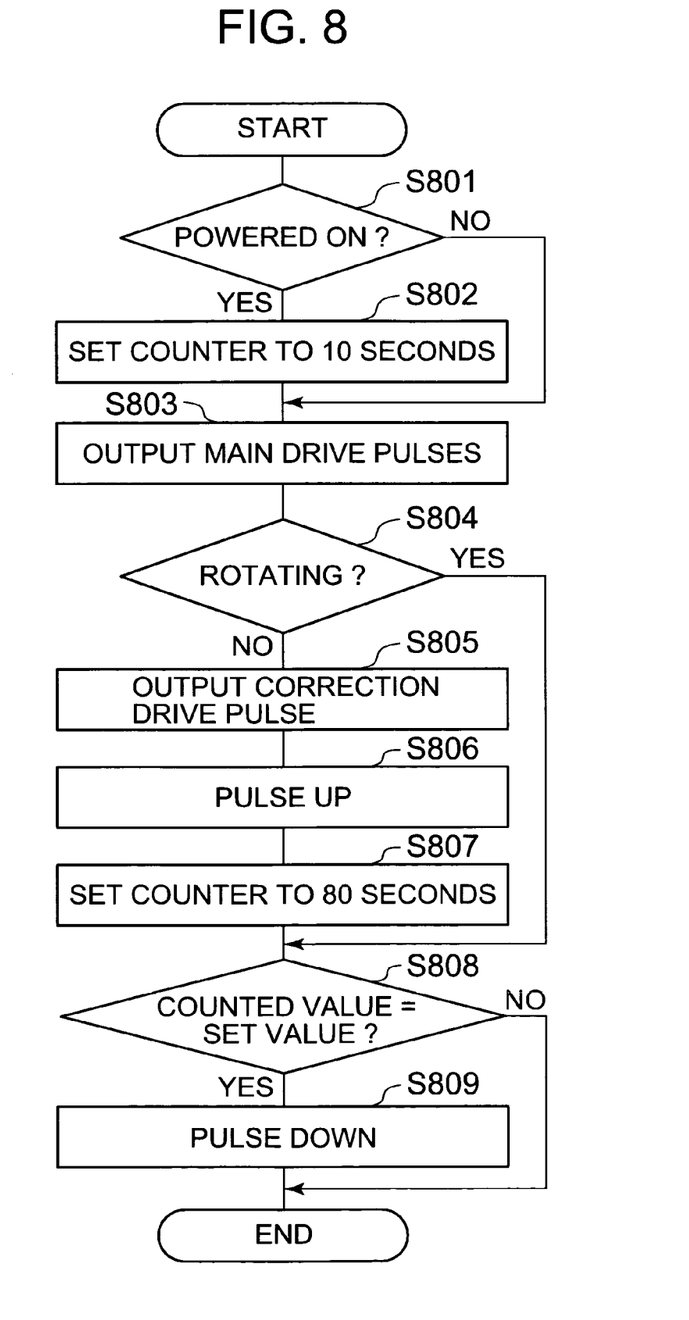
FIG. 8 is a flowchart showing the operation of the stepping motor controller and the analog electronic timepiece in accordance with the embodiment of the invention.

FIG. 8 is a flowchart showing an operation of the stepping motor controller and the analog electronic timepiece in accordance with the embodiment of the invention, and, in particular, showing an operation of controlling the pulse down counter 103. In the embodiment, the cycle of the pulse down counter 103 is changed simply depending on whether the motor has rotated or not, regardless of in which of the detection periods T1 to T3 the reference threshold voltage Vcomp has been detected.

Now, the operation of the stepping motor controller and the analog electronic timepiece in accordance with the embodiment of the invention is described in detail with reference to FIGS. 1 to 8.

In FIG. 1, when the battery 112 is replaced with a new one, the whole of the analog electronic timepiece is powered on and the components 101 to 111 start to operate.

The oscillator 101 generates a signal of a predetermined frequency. The divider 102 divides the signal generated by the oscillator 101 to generate timepiece signals to be used as a timing reference and outputs the timepiece signals to the pulse down counter 103 and the controller 104.

When powered on by the battery replacement, that is, when the driving is initialized (step S801), the controller 104 sets the cycle of the pulse down counter 103 to a first cycle (for example, 10 seconds) (step S802). The pulse down counter 103 starts to operate to perform timing operation by counting the timepiece signals from the divider 102 and output a pulse down control signal to the main drive pulse generator 105 each time the first cycle elapses.

Also, at the same time as setting the cycle of the pulse down counter 103 to the first cycle, the controller 104 outputs a main drive pulse control signal to the main drive pulse generator 105 to rotationally drive the stepping motor 108 using main drive pulse P1max having the maximum energy (step S803). In response to the main drive pulse control signal, the main drive pulse generator 105 outputs the main drive pulse P1max having the maximum energy to the motor driver 107. The motor driver 107 rotationally drives the stepping motor 108 using the main drive pulse P1max. The stepping motor 108 is rotationally driven by the main drive pulse P1max to drive the display section 111. In this way, if the stepping motor 108 operates successfully, the stepping motor 108 is driven by the main drive pulse P1max having the maximum energy to rotates reliably, and then the display section 111 successfully displays current time using hands of a watch, and the like.

When the rotation detector 109 detects a detection signal exceeding the reference threshold voltage Vcomp, the rotation detector 109 outputs the detection signal to the controller 104.

If the controller 104 determines that the detection signal received from the rotation detector 109 has not been detected during any of the first detection period T1, the second detection period T2, and the third detection period T3, that is, the motor is not rotating (step S804), the controller 104 outputs a correction drive pulse control signal to the correction drive pulse generator 106 to control it to output a correction drive pulse P2 (step S805).

In response to the control signal, the correction drive pulse generator 106 outputs the correction drive pulse P2 to the motor driver 107.

The motor driver 107 rotationally drives the stepping motor 108 using the correction drive pulse P2. The stepping motor 108 is rotationally driven by the correction drive pulse P2 to drive the display section 111. In this way, the stepping motor 108 rotates and the display section 111 displays current time using hands of a watch, and the like.

At the same time, the controller 104 outputs a pulse up control signal to the main drive pulse generator 105 to control it to rank up the main drive pulse P1 by one rank (step S806). However, in this case, the main drive pulse P1 is set to the P1max having the maximum energy, so they are not pulsed up. In a normal state, the motor is set to rotate whenever driven by the P1max having the maximum energy. So, it is normally determined in step S804 that the motor is rotating.

Next, the controller 104 changes the cycle of the pulse down counter 103 to a second cycle (for example, 80 seconds) longer than the first cycle (step S807). Accordingly, the pulse down counter 103 outputs the pulse down control signal to the main drive pulse generator 105 each time the second cycle elapses, and then the main drive pulse generator 105 drives the motor using the ranked down main drive pulse P1.

After the cycle of the pulse down counter 103 is set to 80 seconds in step S807, when the counted value of the pulse down counter 103 reaches 80 seconds that is the set value, the pulse down counter 103 outputs the pulse down control signal to the main drive pulse generator 105 to rank down the main drive pulse P1 by one rank (steps S808 and S809). In step S808, if the counted value of the pulse down counter 103 is not equal to the set value, the controller 104 does not pulse down the main drive pulse P1.

In step S804, if the controller 104 determines that the motor is rotating (in the example of FIG. 7, the detection signal has been detected during one of the second detection period T2 or the third detection period T3), the process jumps to S808.

Also, in step S801, if the controller 104 determines that the driving is not initialized, the process jumps to step S803 and proceeds from step S803 as described above.

As described above, in the embodiment, when initializing the driving, the controller 104 controls the main drive pulse generator 105 to drive the stepping motor 108 using the main drive pulse P1max having the maximum energy, and also the controller 104 sets the cycle of outputting the pulse down control signal from the pulse down counter 103 to the first cycle that is shorter than the second cycle for the normal driving, and, when the rotation detector 109 detects that the motor is rotating, the controller 104 pulses down the main drive pulse P1 in the first cycle shorter than the second cycle until the main drive pulse P1 is pulsed down to that having a predetermined energy (with which the stepping motor 108 can be stably rotationally driven). Thus, when initializing the driving, the main drive pulse P1 can start having a sufficient energy for reliably driving the motor to rotate, and can be changed to that having smaller energy in a short time, which can reduce power consumption. Also, consumption current can be measured in a short time.

In the embodiment, initializing is performed by powering on as an example. However, initializing may be performed by pulling the crown (for adjusting a watch, for example). In this case, in response to the operation of pulling the crown, the input circuit 110 outputs the pulling operation signal indicating the pulling operation to the controller 104, and in response to the pulling operation signal, the controller 104 changes the cycle of the pulse down counter 103 to the first cycle.

Figure 9:
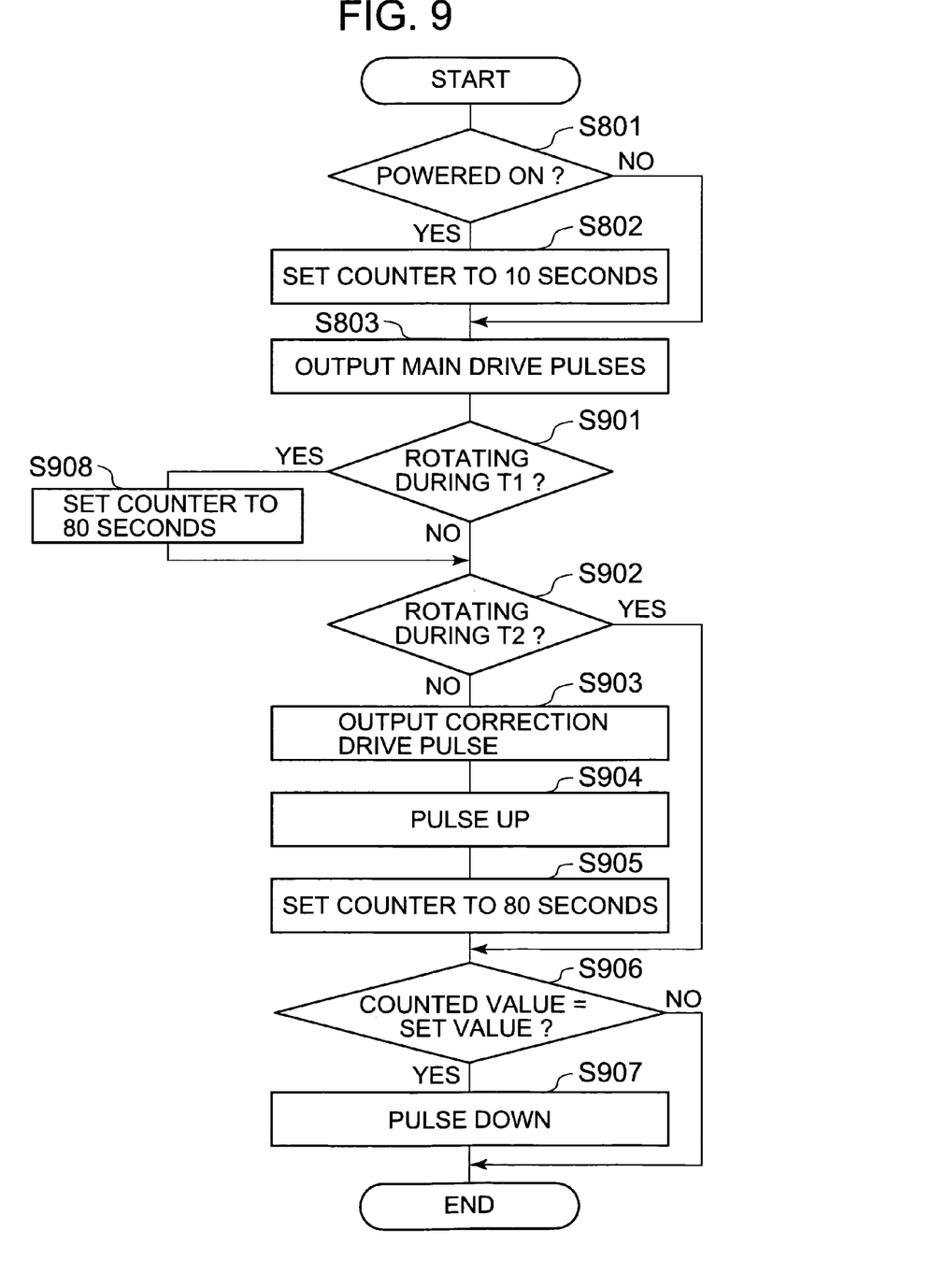
FIG. 9 is a flowchart showing the operation of the stepping motor controller and the analog electronic timepiece in accordance with another embodiment of the invention.

FIG. 9 is a flowchart showing an operation of the stepping motor controller and the analog electronic timepiece in accordance with another embodiment of the invention, and, in particular, showing an operation of controlling the pulse down counter 103. In another embodiment, the cycle of the pulse down counter 103 is changed based on in which of the detection periods T1 to T3 the reference threshold voltage Vcomp has been detected.

Another embodiment is the same as the previous embodiment except the difference of process flow between FIG. 8 and FIG. 9. Now, the operation of another embodiment is described with reference to FIGS. 1 to 7 and 9.

In FIG. 9, when initialized by replacing the battery 112 with a new one, the whole of the analog electronic timepiece is powered on and the components 101 to 111 start to operate. Then, like the previous embodiment, steps S801 to S803 is performed, in which the cycle of the pulse down counter 103 is set to the first cycle (for example, 10 seconds), and the stepping motor 108 is rotationally driven by the main drive pulse P1max having the maximum energy.

When the rotation detector 109 detects a detection signal exceeding the reference threshold voltage Vcomp, the rotation detector 109 outputs the detection signal to the controller 104.

If the controller 104 determines that the detection signal received from the rotation detector 109 has not been detected during the first detection period T1 (step S901), the controller 104 determines whether or not the detection signal has been detected during the second detection period T2 (step S902).

If the controller 104 determines in step S902 that the detection signal has not been detected in the second detection period T2, the controller 104 controls the correction drive pulse generator 106 to drive the motor using the correction drive pulse P2 (step S903), then controls the main drive pulse generator 105 to pulse up the main drive pulse P1 by one rank (S904). However, in this case, the main drive pulse P1 is set to the P1max having the maximum energy, so they are not pulsed up. In response to the control from the controller 104, the correction drive pulse generator 106 drives the stepping motor 108 through the motor driver 107 using the correction drive pulse P2.

Next, the controller 104 sets the cycle of the pulse down counter 103 to the second cycle for the normal driving (for example, 80 seconds) longer than the first cycle (step S905).

Then, when the counted value of the pulse down counter 103 reaches 80 seconds that is the set value, the pulse down counter 103 outputs the pulse down control signal to the main drive pulse generator 105 to rank down the main drive pulse P1 by one rank (steps S906 and S907). In the next driving, in response to the pulse down control signal, the main drive pulse generator 105 pulses down the main drive pulse P1 by one rank and drives the motor 108 through the motor driver 107 using the pulsed-down main drive pulse P1.

In step S902, if the controller 104 determines that the detection signal has been detected during the second detection period T2, the process jumps to step S906.

In step 901, if the controller 104 determines that the detection signal has been detected during the first detection period T1, the controller 104 sets the cycle of the pulse down counter 103 to the second cycle (for example, 80 seconds) (step S908), and then the process proceeds to step S902.

As described above, the stepping motor controller in accordance with the another embodiment divides the rotation detection period of time into the first detection period immediately after the driving using the main drive pulse P1, the second detection period after the first detection period, and the third detection period after the second detection period, and then, when initializing the driving, changes the cycle of the pulse down counter 103 based on in which of the detection periods T1 to T3 a detection signal exceeding the reference threshold voltage Vcomp has been detected.

For example, if the detection result of the first detection period is "1", the controller 104 changes the pulse down cycle of the pulse down counter 103 from the first cycle to the second cycle. If both the detection results of the first and second detection periods are "0", the controller 104 changes the pulse down cycle of the pulse down counter 103 from the first cycle to the second cycle.

Thus, when initializing the driving, the stepping motor 108 can be reliably driven to rotate, and the main drive pulse can be changed to that having smaller energy in a short time, which can reduce power consumption. Also, consumption current can be measured in a short time.

Also in the another embodiment, initializing may be performed by pulling the crown (for adjusting a watch, for example).

Also, according to the above-described embodiments, when initializing the driving, the stepping motor 108 can be reliably driven to rotate, and the main drive pulse can be changed to that having smaller energy in a short time, which makes it possible to construct an analog electronic timepiece that can reduce power consumption. Also, consumption current can be measured in a short time.

Figure 10:
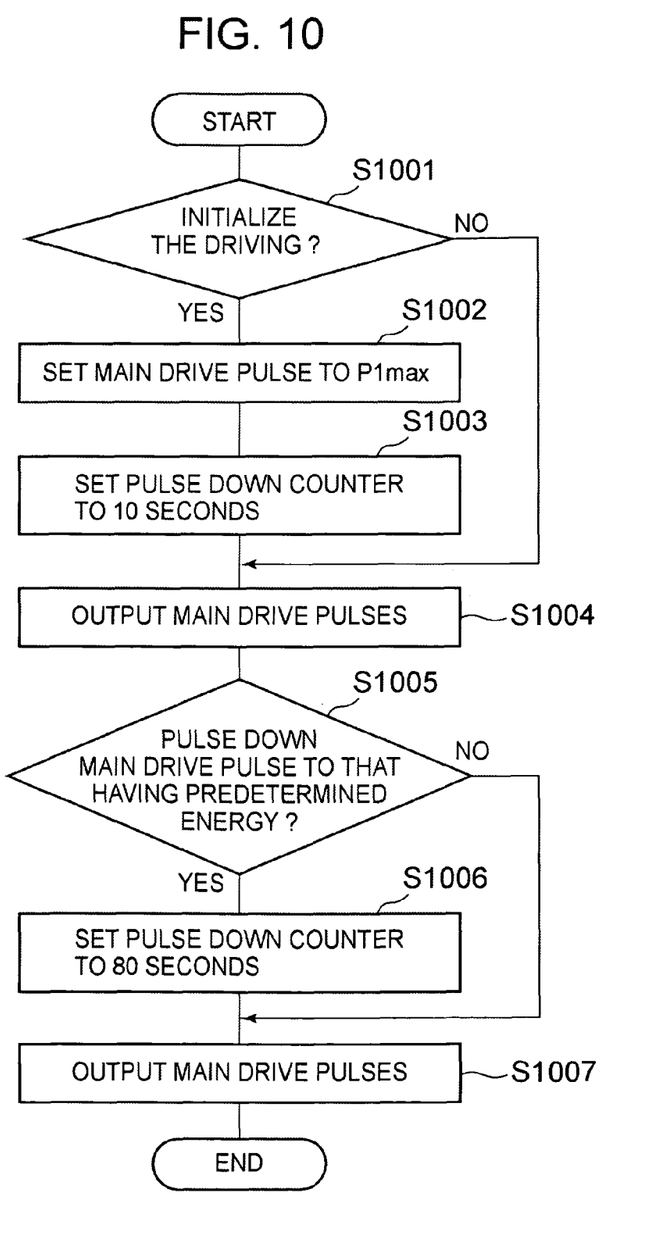
FIG. 10 is a flowchart showing an operation of the stepping motor controller and the analog electronic timepiece in accordance with the embodiment of the invention.

FIG. 10 is a flowchart showing the operation of the stepping motor controller and the analog electronic timepiece in accordance with the embodiment of the invention.

A shown in FIG. 10, the controller 104, when initializing the driving (for example, replacing a battery 112)(step S1001), controls a main drive pulse generator 105 to drive a stepping motor 108 using a main drive pulse Plmax having a maximum energy (step 51002) and sets the generation cycle of a pulse down control signal of a pulse down counter 103 for pulsing down the main drive pulse P1 to a first cycle (for example, 10 seconds) (step S1003) to drive the stepping motor 108 (step S1004), and when pulsing down the main drive pulse P1 to that having a predetermined energy (step S1005), changes the generation cycle of the pulse down control signal of the pulse down counter 103 to a second cycle (for example, 80 seconds)(step S1006) to drive the stepping motor 108 (step S1007).

Also, in the above-described embodiments, the energy of each main drive pulse P1 is changed by changing the pulse width. However, the drive energy can also be changed by changing the pulse voltage or the like.

Also, the above-described embodiments are applicable to a stepping motor for driving a calendar and the like, in addition to hands of a watch.

Also, in the above-described embodiments, an electronic timepiece is described as an example of an application of the stepping motor. However, the stepping motor is widely applicable to electronic devices using a motor.

The stepping motor controller in accordance with the invention is applicable to various electronic devices using a stepping motor.

The electronic timepiece in accordance with the invention is applicable to various analog electronic timepieces including an analog electronic timepiece with various calendar functions, such as an analog electronic watch with a calendar function and an analog electronic clock with a calendar function.

What is claimed is:

1. A stepping motor controller comprising:
a pulse down counter for outputting a pulse down control signal for controlling to pulse down a main drive pulse in a first cycle or a second cycle longer than the first cycle;
a drive pulse generator for outputting a main drive pulse or a correction drive pulse according to a pulse control signal and, in response to the pulse down control signal, pulsing down and outputting the main drive pulse;
a motor driver for rotationally driving a stepping motor in response to the drive pulse from the drive pulse generator;
a rotation detector for detecting whether or not a detection signal generated due to the rotation of the stepping motor during a rotation detection period of time has exceeded a reference threshold voltage; and
a controller for outputting the pulse control signal for controlling the drive pulse generator to drive the stepping motor using one of a plurality of main drive pulses, the energy of each of which is different from the others, or a correction drive pulse, the energy of which is larger than each of the plurality of main drive pulses, based on detection result from the rotation detector,
wherein the controller, when initializing the driving, sets the main drive pulse to that having a maximum energy and sets the generation cycle of the pulse down control signal of the pulse down counter to the first cycle to drive the stepping motor, and when pulsing down the main drive pulse to that having a predetermined energy, changes the generation cycle of the pulse down control signal of the pulse down counter to the second cycle.

2. A stepping motor controller according to claim 1, wherein the rotation detection period of time is divided into a first detection period immediately after the driving using the main drive pulse, a second detection period after the first detection period, and a third detection period after the second detection period, and
wherein, when the rotation detector detects a detection signal exceeding the reference threshold voltage, the controller changes the pulse down cycle of the pulse down counter to the second cycle.

3. An analog electronic timepiece according to claim 2, further comprising a crown, and wherein initializing the driving is performed by pulling the crown.

4. A stepping motor controller according to claim 2,
wherein the rotation detection period of time is divided into a first detection period immediately after the driving using the main drive pulse, a second detection period after the first detection period, and a third detection period after the second detection period, and
wherein, when the rotation detector does not detect a detection signal exceeding the reference threshold voltage during any of the first and second detection periods, the controller changes the pulse down cycle of the pulse down counter to the second cycle.

5. A stepping motor controller according to claim 4, further comprising a battery for providing drive power to the components, and wherein initializing the driving is performed by replacing the battery.

6. An analog electronic timepiece comprising: a stepping motor for rotationally driving hands of a watch; and a stepping motor controller for controlling the stepping motor,
wherein, as the stepping motor controller, a stepping motor controller according to claim 5 is used.

7. An analog electronic timepiece comprising: a stepping motor for rotationally driving hands of a watch; and a stepping motor controller for controlling the stepping motor,
wherein, as the stepping motor controller, a stepping motor controller according to claim 4 is used.

8. An analog electronic timepiece according to claim 4, further comprising a crown, and wherein initializing the driving is performed by pulling the crown.

9. A stepping motor controller according to claim 2, further comprising a battery for providing drive power to the components, and wherein initializing the driving is performed by replacing the battery.

10. An analog electronic timepiece comprising: a stepping motor for rotationally driving hands of a watch; and a stepping motor controller for controlling the stepping motor,
wherein, as the stepping motor controller, a stepping motor controller according to claim 9 is used.

11. An analog electronic timepiece comprising: a stepping motor for rotationally driving hands of a watch; and a stepping motor controller for controlling the stepping motor,
wherein, as the stepping motor controller, a stepping motor controller according to claim 2 is used.

12. A stepping motor controller according to claim 1,
wherein the rotation detection period of time is divided into a first detection period immediately after the driving using the main drive pulse, a second detection period after the first detection period, and a third detection period after the second detection period, and
wherein, when the rotation detector does not detect a detection signal exceeding the reference threshold voltage during any of the first and second detection periods, the controller changes the pulse down cycle of the pulse down counter to the second cycle.

13. A stepping motor controller according to claim 12, further comprising a battery for providing drive power to the components, and wherein initializing the driving is performed by replacing the battery.

14. An analog electronic timepiece comprising: a stepping motor for rotationally driving hands of a watch; and a stepping motor controller for controlling the stepping motor,
wherein, as the stepping motor controller, a stepping motor controller according to claim 13 is used.

15. An analog electronic timepiece comprising: a stepping motor for rotationally driving hands of a watch; and a stepping motor controller for controlling the stepping motor,
wherein, as the stepping motor controller, a stepping motor controller according to claim 12 is used.

16. An analog electronic timepiece according to claim 12, further comprising a crown, and wherein initializing the driving is performed by pulling the crown.

17. A stepping motor controller according to claim 1, further comprising a battery for providing drive power to the components, and wherein initializing the driving is performed by replacing the battery.

18. An analog electronic timepiece comprising: a stepping motor for rotationally driving hands of a watch; and a stepping motor controller for controlling the stepping motor,
wherein, as the stepping motor controller, a stepping motor controller according to claim 17 is used.

19. An analog electronic timepiece comprising: a stepping motor for rotationally driving hands of a watch; and a stepping motor controller for controlling the stepping motor,
wherein, as the stepping motor controller, a stepping motor controller according to claim 1 is used.

20. An analog electronic timepiece according to claim 1, further comprising a crown, and wherein initializing the driving is performed by pulling the crown.

* * * * *